No. 829,875. PATENTED AUG. 28, 1906.
D. R. LOVEJOY.
APPARATUS FOR EFFECTING CHEMICAL ACTION IN GASES.
APPLICATION FILED JULY 19, 1902. RENEWED JULY 5, 1906.
2 SHEETS—SHEET 1.
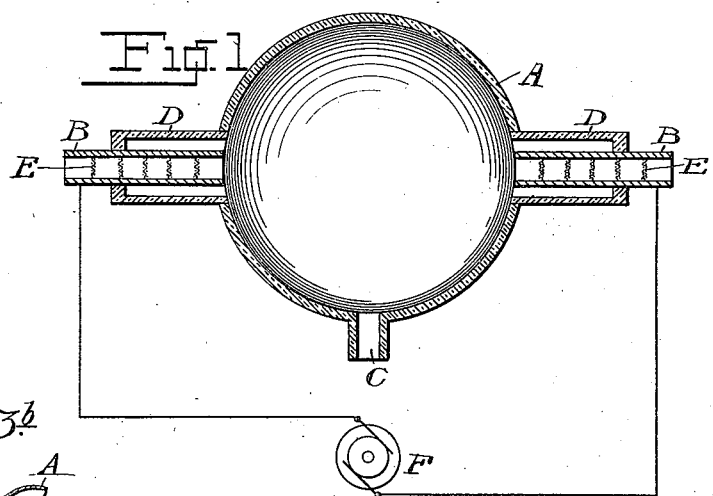
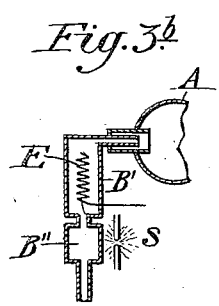
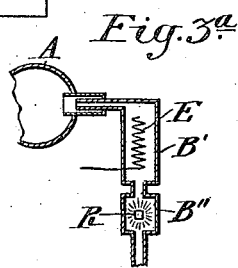
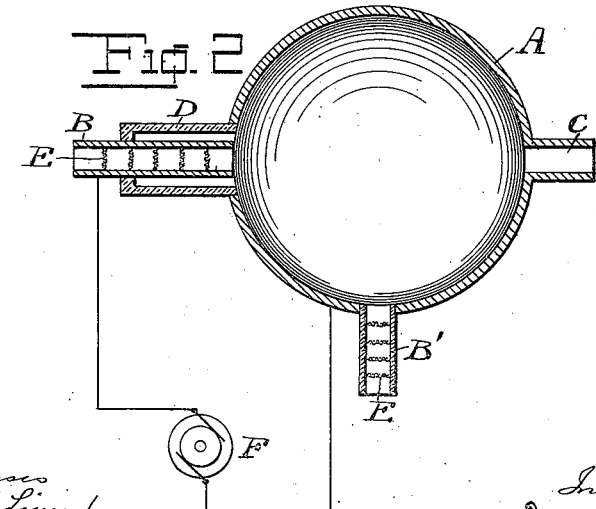

No. 829,875. PATENTED AUG. 28, 1906.
D. R. LOVEJOY.
APPARATUS FOR EFFECTING CHEMICAL ACTION IN GASES.
APPLICATION FILED JULY 19, 1902. RENEWED JULY 5, 1906.
2 SHEETS—SHEET 2.
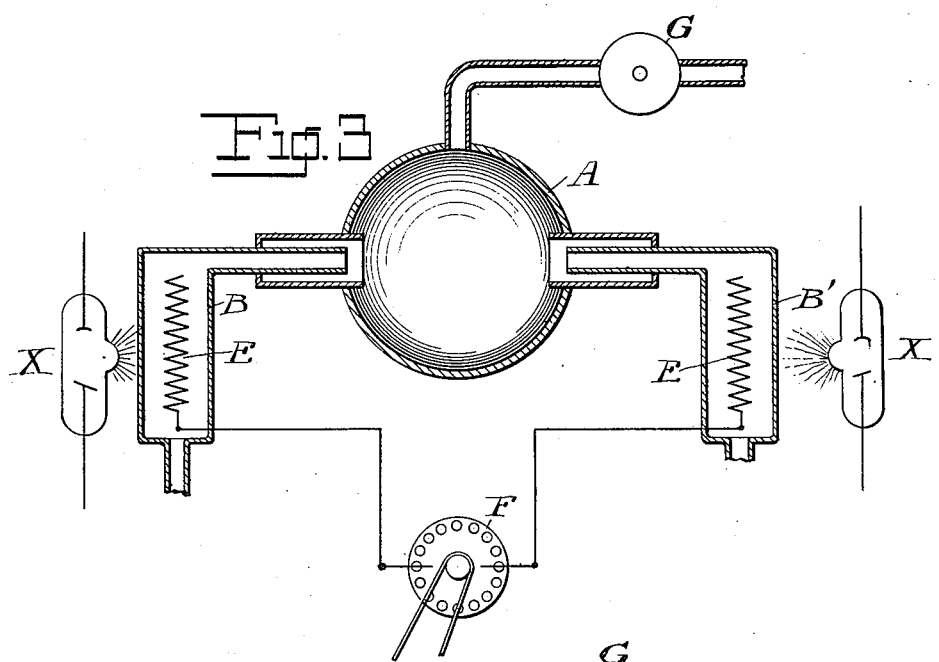
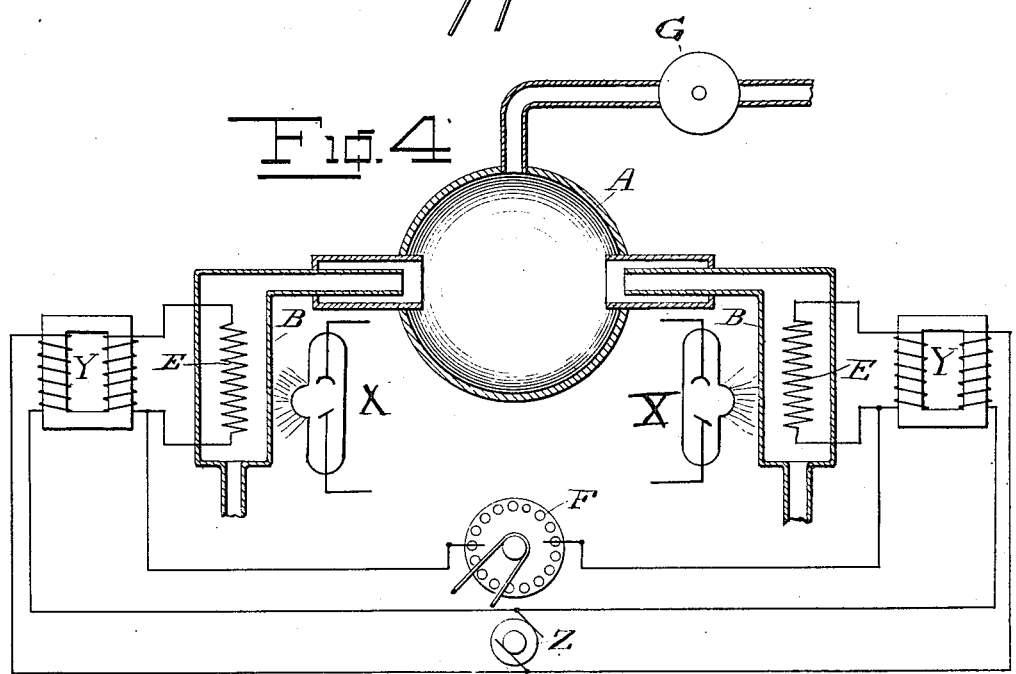

UNITED STATES PATENT OFFICE.

DIMMITT ROSS LOVEJOY, OF NIAGARA FALLS, NEW YORK, ASSIGNOR TO ATMOSPHERIC PRODUCTS COMPANY, OF NIAGARA FALLS, NEW YORK, A CORPORATION OF NEW YORK.

APPARATUS FOR EFFECTING CHEMICAL ACTION IN GASES.

No. 829,875.      Specification of Letters Patent.      Patented Aug. 28, 1906.

Application filed July 19, 1902. Renewed July 5, 1906. Serial No. 324,829.

*To all whom it may concern:*

Be it known that I, DIMMITT ROSS LOVEJOY, a citizen of the United States, residing at Niagara Falls, in the county of Niagara, State of New York, have invented certain new and useful Improvements in Apparatus for Effecting Chemical Action in Gases, of which the following is a specification.

This invention relates to an apparatus for effecting chemical action in gases in the method described in my copending application for United States Letters Patent, Serial No. 52,361, filed March 22, 1901, wherein the combination of two gases is effected by causing their molecules to approach within chemical-acting distance of each other by giving to each of the gases prior to mixing them an electrostatic charge.

It is well known that certain substances—such as platinum sponge, platinized asbestos, &c.—are capable of causing combination of gases, which otherwise would not unite, by bringing their molecules within acting distance of each other. The difficulties of this method are, first, the cost of platinum sponge or platinized asbestos, and, second, the diminution of the action after a time, due to the clogging up of the pores of the sponge or asbestos. In this invention the use of any solid or liquid material for effecting the required juxtaposition of the gaseous molecules is dispensed with and the molecules are caused to approach each other by means of electrostatic attraction. To this end the two gases to be combined are led into a chamber after conducting them through passages wherein they are given an electrostatic charge. They may be led through metallic or electrically-conducting inlets and during their passage through these inlets may be charged electrically by contact with the walls of the passage to a very high electrical potential, one gas positively and the other gas negatively, or instead of having the walls of the passage form part of the charging-electrodes the electrodes may be placed within the passage so that the gases will pass in contact therewith. While the electrostatic charging of the gases may be effected by simply passing them in contact with metallic electrodes bearing a very high electrostatic charge, it has been found best to simultaneously subject the gaseous molecules to the action of such charged electrodes and to radiant energy in the form of heat, ultra-violet light, Roentgen rays, radium rays, uranium rays, or other radiant energy adapted to increase the effect of the charging-electrodes, or the charging-electrodes themselves may be heated to redness for a like object. When the charging-electrode is used without the added influence of external source of radiant energy, I have found that a very high potential is necessary and potential sufficient to produce a spark of about one inch through air from a small static machine has been found sufficient. I do not make use of a spark, however, as the electrodes are placed farther apart than the sparking distance. A greater potential would probably under such conditions of operation produce greater results. When, however, the gases are subjected to the action of radiant energy from external source, while receiving the electrostatic charge a few volts are sufficient. On entering the chamber the positively-charged molecules of the one gas are attracted to the negatively-charged molecules of the other gas and are thus brought within the range of chemical attraction and a chemical combination is thus effected. By this method gases may be caused to unite even when energy is absorbed by their union, as it is only necessary to charge the two sets of molecules to a sufficiently high potential with respect to each other to store in them sufficient energy to effect the combination after bringing them into chemical contact.

The invention appears to be applicable not only to the combining of oxygen and nitrogen, but to the combining of any other gases which are capable of combination.

In charging the gases separately in this manner there will also occur a dissociating effect in the molecules of each gas. This will be favorable to the process, as described, as the partly-dissociated gas will combine more readily. This dissociating effect may also be of use in the production of allotropic forms of elementary gases—for example, ozone—or in the decomposition of compound gases into their elements.

For the formation of ozone both gases—that is to say, the one bearing the positive and the other the negative electrostatic charge—should be oxygen.

In the accompanying drawings I have shown, partly in section and partly in diagram, four forms of apparatus embodying my invention.

In Figure 1, A represents the combining-chamber, preferably of non-conducting material. B B are the inlet-pipes, of conducting material and provided with permeable conductors or diaphragms of metallic or conducting gauze E E, having about one hundred meshes to the inch, so as to insure the thorough contact of the gaseous molecules with the electrified surfaces. D D are insulating-sheaths to prevent loss of electricity by leakage, and C is the outlet for the resulting products. F is a source of high electrical potential.

Fig. 2 shows a modification of this apparatus in which the combining-chamber itself is made of conducting material and serves as one of the electrically-charged surfaces. One gas enters at B' and is charged by contact with the inlet-tube of conducting material and gauze diaphragms and also by contact with the walls of the chamber. The other gas enters at B through the conducting-tube and gauze diaphragms supported on an insulating-sheath, as in Fig. 1, the combined gases passing out at C, as before. F is again a source of great difference of electrical potential. Variations of details of the conducting-chambers are non-essential and obvious.

In Fig. 3 is shown the form of the apparatus in which the gases are subjected to the action of charged electrodes and of radiant energy simultaneously. Here the charged electrodes E E are shown inclosed in the walls of the inlet pipes or chambers B B'. The walls of the chamber B are made of material pervious to Roentgen rays or other kinds of radiant energy which may be derived from a source diagrammatically indicated at X X, whereas in this view the radiant energy is shown diagrammatically as emanating from a Crookes tube. It is to be understood that any other form of radiant energy may be used in the manner shown—such as radium, uranium, ultra-violet, or heat rays.

In Fig. 3ª is shown a modification as a detail view in which the gases are first subjected to the influence of radiant energy in a chamber B'' before being electrically charged by the electrodes. The source of radiant energy may be inclosed in the chamber B'' or the walls of the chamber may be of a material permeable to the radiant energy. In this view the source of radiant energy is diagrammatically indicated at R as uranium or radium. It is understood that any other of the forms of radiant energy may be substituted for R.

Fig. 3ᵇ is a view showing diagrammatically a modification in which the use of ultra-violet rays are represented. It will be understood that this or any of the other forms of radiant energy may be used simultaneously with the charging of the gases or as preliminary step.

In Fig. 4 is shown a form of apparatus employed wherein the charging-electrodes are kept hot to facilitate charging by subjecting the gases to heat radiations. Here the electrodes E E, of platinum or other wire, are heated to a moderately bright-red heat by current from transformers Y Y, whose primary and secondary coils are very highly insulated from each other in order to prevent loss of electrostatic charge through the circuit communicating with the alternator Z.

While for the sake of clearness of diagram the heating means are illustrated in this separate figure, it is obvious that they may be applied to any of the forms of the apparatus shown in Figs. 3, 3ª, and 3ᵇ—that is to say, the electrodes of Fig. 3 may be heated, as shown in Fig. 4, or otherwise, and therefore the electrostatic charging of the gas may be carried on under the combined influence of heat and the other forms of radiant energy mentioned.

The gas may be caused to pass into the chamber A by any suitable means—as, for instance, by means of an exhaust-fan G. (Shown for convenience in Figs. 3 and 4.)

In case only one gas is to be acted upon it may be supplied at both sides of the apparatus, the two portions being then allowed to mix or kept separate until discharged by other means.

While I have given a theory of the operation of the method, it will be understood that it is only explanatory, and it is immaterial to the process by what reasoning it is explained, provided that the effect of causing reaction of the gases on one another by the force or effect of the electrostatic energy stored in the gases is obtained.

I have found by experiment that when approximately equal volumes of oxygen and nitrogen are passed through their respective electrodes at ordinary temperature and pressure, the electrodes being of above one hundred-mesh gauze, the result is very good. The resulting gases after passing through and mixing contained an appreciable quantity of nitrous oxids, as shown by reaction in the "iodid-of-starch" test and also unmistakably by the odor. The electromotive force employed in this experiment was that given by a static machine capable of producing a spark of about one inch in air. Afterward the electrodes were subjected to the Roentgen rays from an eight-inch Crookes tube set as close to them as possible, (three or four inches away.) The other conditions were the same as in the experiment without radiant energy, and in this experiment I found that the yield of nitrous oxids was somewhat greater than in the simple experiment described above.

Having thus described my invention, what I claim as new therein, and desire to secure by Letters Patent, is—

1. In an apparatus for effecting the combination of gases, the combination of a suitable reaction chamber or vessel, means for supplying gases thereto and means for imparting to said gases prior to entering said vessel electrostatic charges of opposite potential, substantially as set forth.

2. In an apparatus for effecting the combination of gases, the combination of a suitable reaction chamber or vessel, means for supplying gases thereto and means for imparting to said gases prior to entering said vessel electrostatic charges of opposite potential, comprising a source of high difference of electric potential and a circuit therefrom including electrodes in the gas-supply to the said chamber or vessel.

3. In an apparatus for effecting the combination of gases, the combination of a suitable reaction chamber or vessel, means for supplying gases thereto and means for imparting to said gases prior to entering said vessel electrostatic charges of opposite potential, comprising a source of difference of electric potential and a circuit therefrom including electrodes in the gas-supply to the said chamber or vessel, and means for heating said electrodes.

4. In an apparatus for effecting the combination of gases, the combination of a suitable reaction chamber or vessel, means for supplying gases thereto and means for imparting to said gases prior to entering said vessel electrostatic charges of opposite potential comprising a source of difference of electric potential and a circuit therefrom including electrodes in the gas-supply to the said chamber or vessel, and means for subjecting said gases to the influence of a source of radiant energy.

5. In an apparatus for effecting the combination of gases, the combination of a suitable reaction chamber or vessel, means for supplying gases thereto and means for imparting to said gases prior to entering said vessel electrostatic charges of opposite potential comprising a source of difference of electric potential and a circuit therefrom including electrodes in the gas-supply to the said chamber or vessel, means for heating said electrodes, and means for subjecting said gases to the influence of a source of radiant energy.

6. In an apparatus for effecting the combination of gases, the combination of a reaction chamber or vessel, passages for leading streams of gas severally thereto, electrodes in said passages and means for giving to said electrodes electrostatic charges of different potential.

7. The combination with the receiver having an outlet and two inlet passages, of permeable conductors located in the respective inlet-passages, and a source of electrostatic energy having opposite poles connected to the respective conductors aforesaid.

DIMMITT ROSS LOVEJOY.

Witnesses:
J. C. ROBERTS,
MARGARET E. TUSHEY.